United States Patent
Birkeland (10) Patent No.: US 10,364,633 B2
(45) Date of Patent: Jul. 30, 2019

(54) METHOD AND MOBILE CUTTING TOOL FOR CUTTING A SUBSEA TUBULAR STRUCTURE

(71) Applicant: Smart Installations AS, Tananger (NO)

(72) Inventor: Petter Birkeland, Tananger (NO)

(73) Assignee: Smart Installations AS, Tananger (NO)

( * ) Notice: Subject to any disclaimer, the term of this patent is extended or adjusted under 35 U.S.C. 154(b) by 0 days.

(21) Appl. No.: 15/755,289

(22) PCT Filed: Dec. 6, 2016

(86) PCT No.: PCT/NO2016/050254
§ 371 (c)(1),
(2) Date: Feb. 26, 2018

(87) PCT Pub. No.: WO2017/099607
PCT Pub. Date: Jun. 15, 2017

(65) Prior Publication Data
US 2018/0274318 A1    Sep. 27, 2018

(30) Foreign Application Priority Data
Dec. 11, 2015   (NO) .................................. 20151722

(51) Int. Cl.
*E21B 29/12* (2006.01)
*E02D 9/04* (2006.01)
(Continued)

(52) U.S. Cl.
CPC .............. *E21B 29/12* (2013.01); *B23D 15/04* (2013.01); *B23D 21/006* (2013.01);
(Continued)

(58) Field of Classification Search
CPC ...... E21B 29/12; E21B 41/0007; B23D 15/04; B23D 21/006; B23K 9/0282; B23K 9/16; B23K 9/167; B23K 9/173; E02D 9/04
See application file for complete search history.

(56) References Cited

U.S. PATENT DOCUMENTS

| | | |
|---|---|---|
| 4,641,694 A | 2/1987 | Rohde |
| 6,554,073 B2 | 4/2003 | McGarian |
| (Continued) | | |

FOREIGN PATENT DOCUMENTS

| | | | |
|---|---|---|---|
| GB | 2 310 842 | 9/1997 | |
| GB | 2313859 A | * 12/1997 | ............ B23D 21/00 |
| (Continued) | | | |

OTHER PUBLICATIONS

Norwegian Search Report, Norwegian Patent Application No. 20151722, dated Jun. 23, 2016.
(Continued)

*Primary Examiner* — Matthew R Buck
(74) *Attorney, Agent, or Firm* — Andrus Intellectual Property Law, LLP (57) ABSTRACT

A mobile cutting tool is for cutting a subsea tubular structure and has i) a tool body for receiving the subsea tubular structure in an enclosure thereof; ii) an actuator mounted on the tool body at one side of the enclosure; iii) a non-rotatable cutting element provided on the actuator, the actuator with the cutting element for carrying out a translational cutting movement through the enclosure including the subsea tubular structure, and iv) a reaction member mounted at an opposite side of the enclosure of the tool body opposite to the cutting element for applying a reaction force on the subsea tubular structure during cutting. A method is for cutting a subsea tubular structure, wherein a non-rotating translation cutting movement is used for cutting.

20 Claims, 10 Drawing Sheets

(51) Int. Cl.
  *B23D 15/04* (2006.01)
  *B23D 21/00* (2006.01)
  *B23K 9/167* (2006.01)
  *B23K 9/173* (2006.01)
  *E21B 41/00* (2006.01)
  *B23K 9/028* (2006.01)
  *B23K 9/16* (2006.01)
  *B23K 101/10* (2006.01)

(52) U.S. Cl.
  CPC .............. *B23K 9/0282* (2013.01); *B23K 9/16* (2013.01); *B23K 9/167* (2013.01); *B23K 9/173* (2013.01); *E02D 9/04* (2013.01); *E21B 41/0007* (2013.01); *B23K 2101/10* (2018.08)

(56) References Cited

U.S. PATENT DOCUMENTS

| | | | | |
|---|---|---|---|---|
| 7,121,310 B2* | 10/2006 | Clark | ................ | B23D 57/0084 144/24.12 |
| 7,351,010 B1* | 4/2008 | Kelly | .................... | B23D 21/00 405/156 |
| 8,056,633 B2* | 11/2011 | Barra | ................... | E21B 19/002 166/298 |
| 8,656,939 B2* | 2/2014 | Sharp | .................. | B23D 21/006 137/15.08 |
| 2005/0194000 A1* | 9/2005 | Todack | .................. | B28D 1/222 125/23.01 |
| 2012/0291606 A1* | 11/2012 | Khoury | .................. | B23D 15/04 83/639.1 |
| 2013/0152759 A1* | 6/2013 | Franze | .................. | B23D 21/00 83/743 |
| 2014/0147217 A1* | 5/2014 | Ammerlaan | ....... | B23D 57/0084 405/203 |

FOREIGN PATENT DOCUMENTS

| | | | | |
|---|---|---|---|---|
| WO | 2000078491 | | 12/2000 | |
| WO | 2010/043850 | | 4/2010 | |
| WO | WO-2010043850 A1 * | | 4/2010 | ............. B23D 15/14 |
| WO | 2014093530 | | 6/2014 | |

OTHER PUBLICATIONS

International Search Report, PCT/NO2016/050254, dated Feb. 20, 2017.
Written Opinion and Reply, PCT/NO2016/050254, dated Feb. 20, 2017.
Written Opinion and Reply, PCT/NO2016/050254, dated Nov. 2, 2017.
International Preliminary Report on Patentability, PCT/NO2016/050254, date of completion Mar. 22, 2018.
European Search Report, EP Patent Application No. 16873432.5, dated May 22, 2019.

* cited by examiner

METHOD AND MOBILE CUTTING TOOL FOR CUTTING A SUBSEA TUBULAR STRUCTURE

CROSS-REFERENCE TO RELATED APPLICATIONS

This application is the U.S. national stage application of International Application PCT/NO2016/050254, file Dec. 6, 2016, which international application was published on Jun. 15, 2017, as International Publication WO 2017/099607 in the English language. The International Application claims priority of Norwegian Patent Application No. 20151722, filed Dec. 11, 2015. The international application and Norwegian application are both incorporated herein by reference, in entirety.

The invention relates to a mobile cutting tool for cutting a subsea tubular structure. The invention also relates to a subsea system comprising such cutting tool. The invention also relates to a method for cutting a subsea tubular structure.

Different techniques and tools for cutting subsea tubular structures have been reported in the prior art so far. For instance in the field of recovering subsea wellheads of abandoned wells.

U.S. Pat. No. 6,554,073 B2 discloses a method of cutting a well casing located beneath a subsea wellhead. The method comprising the steps of: running a cutting tool through the wellhead into the casing; securing the position of a motor relative to the wellhead so as to transmit rotary reaction forces from the motor to the wellhead or a fixture secured relative to the wellhead; and operating the motor so as to rotate the cutting tool and thereby effect cutting of the casing. This solution overcomes the problems associated with techniques of requiring the use of explosive charges or a drilling rig located above the wellhead.

Next to internal cutting techniques also external cutting techniques have been reported. These techniques are based on using a diamond wire saw.

WO 2014/093530 A1 discloses an underwater wire saw comprising a frame, one or more arms connected to the frame with a predetermined number of the arms comprising a wire tensioner and a selectively telescoping or collapsing tube within a tube, and a continuous wire guided by a plurality of wire guides and tensioned using the wire tensioner. The underwater wire saw may further comprise a clamp.

WO 00/78491 A1 discloses an underground apparatus for servicing subsea pipelines. The apparatus provides a telescoping frame, which can be lowered to the vicinity of the pipeline. The frame has an open section so that it can straddle the pipeline and outer jacket and fixate itself releasably so that it can be selectively repositioned. A cutting structure having a diamond wire saw is secured to a telescoping sub frame. The cutting structure can be rotated about the longitudinal axis of the sub frame, as well as advanced along the direction of the longitudinal axis of the frame due to the telescoping feature of the sub frame. The cutting structure can also be moved pivotally about an axis of rotation, which is outside and generally perpendicular to the longitudinal axis of the pipe. Thus, combining the telescoping feature with the pivoting feature and the feature of being able to rotate about the longitudinal axis, a variety of different cuts can be made.

A major problem with all the known techniques of cutting subsea tubular structures like casings is that they are relatively slow, i.e. one cutting operation of a casing may typically take over one hour to finish. In the field of oil and gas recovery, this implies many additional costs, i.e. time is money.

The object of the invention is to remedy or to reduce at least one of the drawbacks of the prior art, or at least to provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a mobile cutting tool for cutting a subsea tubular structure, for instance a casing of an abandoned well. The mobile cutting tool comprises:
- a tool body configured for receiving the subsea tubular structure in an enclosure thereof;
- an actuator mounted on the tool body at one side of the enclosure;
- a non-rotatable cutting element, for instance a cutting knife, provided on the actuator, the actuator with the cutting element being configured for carrying out a translational cutting movement through the enclosure including the subsea tubular structure, and
- a reaction member mounted at an opposite side of the enclosure of the tool body opposite to the cutting element for applying a reaction force on the subsea tubular structure during cutting, wherein the reaction member forms part of a further actuator, wherein the reaction member is provided on or integrated with a piston rod or thread bar of the further actuator, which further actuator is configured for opening and closing said enclosure for receiving said subsea tubular structure.

The effects of the mobile cutting tool in accordance with the invention are as follows. Whereas in the prior art solutions time consuming cutting operations are chosen, the invention conveniently cuts the subsea tubular structure with a translational cutting movement using at least one knife and an opposing reaction member. It is clear that the actuator must be dimensioned in accordance with the specifications of the subsea tubular structure that is to be cut, that means that the amount of force it is able to produce is high enough to mechanically severe the subsea tubular structure. In practise, most tubular structures will, during the cutting, first be squeezed before they are severed. This provides for a further advantage, which may be exploited in the invention, as will be explained with reference to some embodiments. The inventor has found out that, with simple translational cutting and by choosing the right strength, the cutting time may be reduced to only a few minutes, which is a significant improvement over the existing techniques. In addition, this reduces operational costs tremendously. In the invention, the subsea tubular structure can be conveniently received in the enclosure and subsequently locked in this position, such that the cutting can be carried out in an easy and efficient manner. It may be important to lock the position of the piston rod or thread bar, when the piston rod or thread bar is fully extended, in that a force applied on the reaction member will not result in bending of the piston rod or thread bar of the further actuator. This may be achieved by configuring the tool body with a recess such that an end of the piston rod or thread bar of the further actuator is received therein at full extension of the piston rod or thread bar.

The mobile cutting tool in accordance with the invention is to be distinguished from cutting devices, which are present in blowout preventers (BOP's). A blowout preventer is not a mobile device at all. Even if it may be removed after having been used for a period and optionally placed at another well, such usage is considered fixed or static.

The word "mobile" in accordance with the invention means that the cutting tool of the invention is not bound to one location at all. It may be freely moved around and used at any location if so desired.

Another significant advantage of the solution of the invention is that there is no longer a need to clamp the cutting tool to the tubular structure. This is in huge contrast with the prior art solutions using sawing technology, which all require firm clamping to the tubular structure, or else the sawing effect will be partially or completely gone. In other words, the invention provides for a clamp-free mobile cutting tool.

In an embodiment of the mobile cutting tool in accordance with the invention the actuator comprises a cylinder, for example a hydraulic cylinder. With "cylinder" it is here meant a system comprising a cylinder including a piston and a piston rod connected to the piston. Actuators comprising such cylinder are very suitable for producing large actuation forces, in particular when it concerns a hydraulic cylinder. An alternative actuator could be a thread bar actuator driven by an electric motor, for example. Also, a gear system may be used in order to increase the torque on the thread bar actuator.

In an embodiment of the mobile cutting tool in accordance with the invention the reaction member is provided with a further cutting element directed towards the non-rotatable cutting element for facilitating the cutting. A further cutting element on the reaction member is not essential, yet it facilitates the cutting process as it concentrates the force on a smaller area, resulting in a higher pressure during the cutting.

In an embodiment of the mobile cutting tool in accordance with the invention the further actuator comprises a further cylinder, for example a further hydraulic cylinder. A cylinder, and particularly a hydraulic cylinder, may be conveniently used as a further actuator in a subsea cutting tool.

An embodiment of the mobile cutting tool in accordance with the invention further comprises at least one buoyancy member for controlling the buoyancy of the mobile cutting tool when the mobile cutting tool is used subsea. In particular when the weight of the cutting tool becomes significant it is beneficial to provide the cutting tool with its own buoyancy member for facilitating better manipulation and control of the cutting tool subsea.

An embodiment of the mobile cutting tool in accordance with the invention further comprises at least one digging device for digging into the seabed for freeing a greater length of a tubular structure extending through the seabed. This embodiment is advantageous as it facilitates removing a larger part of the subsea tubular structure, such that the cut takes place at a level below the original seabed. Even though the word "digging device" is used here, it is meant to include all techniques for removing material of the seabed to free the subsea tubular structure ending therethrough. These techniques include sucking, jetting/blowing, mechanical digging, and so on.

An embodiment of the mobile cutting tool in accordance with the invention further comprises at least one welding device for welding the subsea tubular structure after that it has been cut. After carrying out the cut the subsea tubular structure is generally squeezed together forming a so-called "cold weld". However, this welding may not be completely tight. The embodiment here discussed has as an advantage that the welding is improved by the welding device.

In an embodiment of the mobile cutting tool in accordance with the invention the welding device is selected from a group comprising: a shielded metal arc-welding device, a flux cored arc-welding device, and a gas tungsten arc-welding device. These techniques have been proven feasible to be carried out subsea.

In an embodiment of the mobile cutting tool in accordance with the invention the cutting tool is provided with a handle for being coupled to and handled by a subsea vehicle, such as an ROV. A subsea vehicle such as an ROV is a very convenient vehicle for maneuvering and handling a cutting tool subsea.

In a second aspect the invention relates to a subsea system for cutting a subsea tubular structure. The system comprises:
  a subsea vehicle, and
    the mobile cutting tool according to the invention, wherein the cutting tool is coupled to the subsea vehicle.

The subsea system of the invention follows the same advantages and effects as the mobile cutting tool of the invention.

In an embodiment of the subsea system in accordance with the invention the subsea vehicle comprises a remotely operated vehicle (ROV). ROV's are very convenient subsea vehicles for handling and controlling subsea tools.

In a third aspect the invention relates to a method for cutting a subsea tubular structure.

The method comprises the following steps:
  providing a mobile cutting tool in accordance with the invention;
  positioning the mobile cutting tool in cutting position exterior to the subsea tubular structure;
  fixing the position of the mobile cutting tool with respect to the subsea tubular structure, and
  activating the mobile cutting tool for cutting the subsea tubular structure in a translation movement of the at least one cutting element.

The method of the invention follows the same advantages and effects as the cutting tool of the invention. It goes without saying that the method in accordance with the invention may also be carried out with other tools as the ones described in this specification.

In a fourth aspect the invention relates to a method for recovering a subsea wellhead from a casing of a well. This method for recovering a subsea wellhead comprises the method of cutting a tubular structure in accordance with the invention. Wellheads are large complex structures, which need to be recovered from the seabed after abandonment of the well. The invention may be conveniently used for this method.

In an embodiment of the method for recovering a subsea wellhead in accordance with the invention the subsea tubular structure comprises a casing of the wellhead between the seabed and the wellhead. In addition, in the step of positioning the mobile cutting tool, the mobile cutting tool is positioned exterior to the casing and below the wellhead. Furthermore, in the step of activating the mobile cutting tool, the wellhead is separated from the well.

An embodiment of the method for recovering a subsea wellhead in accordance with the invention further comprises the step of digging into the seabed for freeing a greater length of the casing for allowing cutting of the casing below an original level of the seabed. This embodiment is advantageous as it facilitates removing a larger part of the casing below the wellhead, such that the cut takes place at a level below the original seabed. Digging here includes sucking, jetting, blowing, mechanical digging, and so on.

In an embodiment of the method for recovering a subsea wellhead in accordance with the invention, in the step of positioning the mobile cutting tool, the mobile cutting tool is positioned below the original level of the seabed.

An embodiment of the method for recovering a subsea wellhead in accordance with the invention further comprises the step of welding the subsea tubular structure after that it has been cut. After carrying out the cut the subsea tubular structure is generally squeezed together forming a so-called "cold weld". However, this welding may not be completely tight. The embodiment of the method here discussed has as an advantage that this welding is improved by the further welding. The methods of welding, which may be used subsea are shielded metal arc-welding, flux cored arc-welding, and gas tungsten arc-welding.

An embodiment of the method for recovering a subsea wellhead in accordance with the invention comprises the step of carrying out a squeezing step after that the cut as has been done, wherein the squeezing step is done at a position below the original cut. This embodiment will be discussed in more detail in the detailed description of the figures.

In an embodiment of the method for recovering a subsea wellhead in accordance with the invention, the positioning of the mobile cutting tool is done with a subsea vehicle, for example an ROV. Subsea vehicles, such as ROV's, are very suitable for handling and controlling subsea tools. This embodiment also applies to the general method of cutting subsea tubular structures.

An embodiment of the method for recovering a subsea wellhead in accordance with the invention further comprises, before the step of positioning the mobile cutting tool in cutting position, the step of lowering the mobile cutting tool from the sea surface into the sea by means of a hoisting tool, for example a crane. In this embodiment of the method for recovering a subsea wellhead the mobile cutting tool may be conveniently stored on a floating object, such as a ship, and lowered into the sea when a cutting operation is needed. This embodiment also applies to the general method of cutting subsea tubular structures.

An embodiment of the method for recovering a subsea wellhead in accordance with the invention further comprises the step of hoisting the wellhead to the surface after separating the wellhead from the well. This embodiment of the method effectively completes the recovery of the wellhead after that it has been cut.

An embodiment of the method for recovering a subsea wellhead in accordance with the invention further comprises the step of refilling the pit after having separated the wellhead from the well. In this embodiment the abandoned well is effectively covered after that the wellhead has been recovered, and after that the casing has been welded.

In the following is described an example of a preferred embodiment illustrated in the accompanying drawings, wherein.

The figures and description show a mobile cutting tool, which offers a unique and alternative solution to the existing solutions of cutting subsea. The solution of the invention is free from constraints of owning vessels, complex/high-cost equipment and labour-intensive offshore operations. The invention enables a low-cost system, which may utilize existing client vessels, including on-board crew, dedicated remote underwater systems and labour-efficient new technology to offer life-of-field services. It facilitates an on-demand remotely operated kit, which can be easily taken on-board dedicated vessels ready to be launched without any significant mobilization time.

An important part of the invention resides in the carrying out of a pure translational cutting movement for severing a subsea tubular structure, such as a casing below a wellhead. Prior art methods disclose time-consuming methods such a diamond wire cutting. A translational cutting movement may be carried out with a huge variety of different tools. In the figures and detailed description only one example is given. It must be stressed that the invention is not limited to this example.

Figure 1:
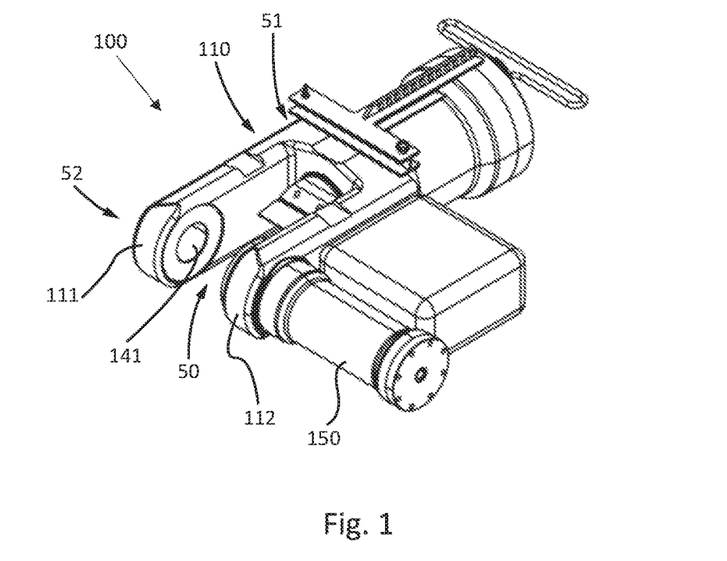
FIG. 1 shows a mobile cutting tool in accordance with an embodiment of the invention.
Figure 2:
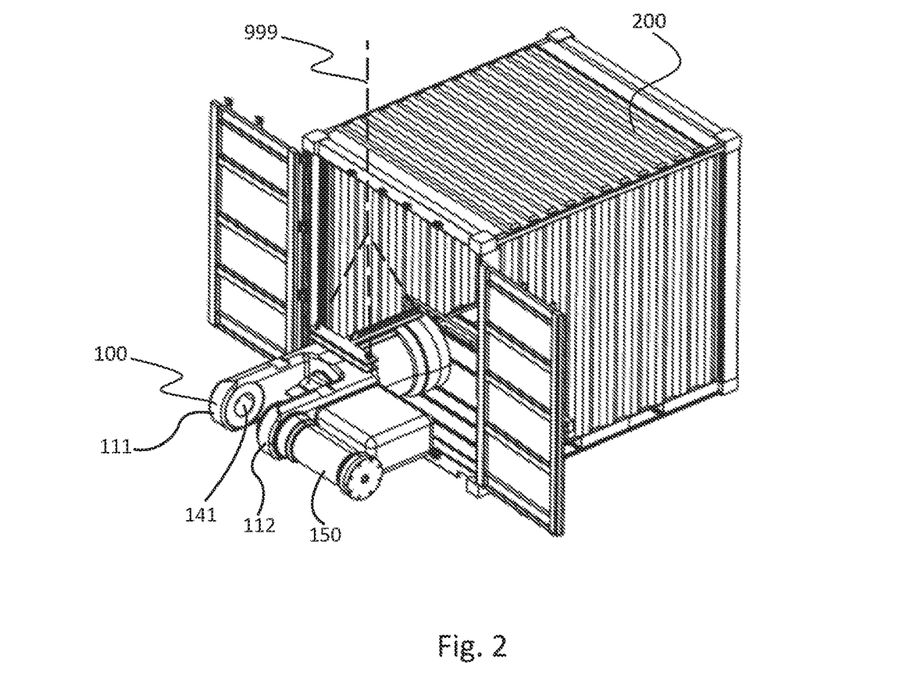
FIG. 2 shows the mobile cutting tool of FIG. 1, when being hoisted out of a container.

FIG. 1 shows a mobile cutting tool 100 in accordance with an embodiment of the invention. FIG. 2 shows the mobile cutting tool 100 of FIG. 1, when being hoisted out of a container 200. Such container may be conveniently placed on board a vessel, for example. As illustrated in FIG. 2, the mobile cutting tool 100 may be hoisted out of the container 200 by means of a hoisting cable 999 of a crane (not shown). The container 200 may be a 10-feet container and may store spare parts and other required equipment. In this way the cutting tool 100 takes up very little space on board a vessel and thereby provides flexibility and eliminates mobilization costs. Jobs can be planned ahead on-shore. When a window of opportunity opens up, removal of a well-head can be done within a very short time. It is important to note that the cutting tool 100 in accordance with the invention is a mobile/movable cutting tool, i.e. it is meant to be transportable to its desired location for cutting a respective subsea tubular structure.

Figure 3:
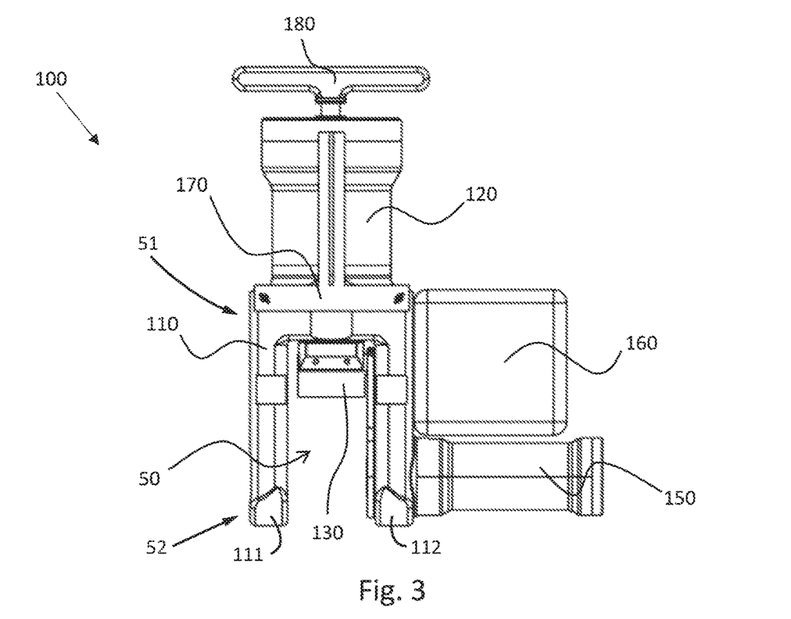
FIG. 3 shows a top view of the mobile cutting tool of FIG. 1.

FIG. 3 shows a top view of the mobile cutting tool 100 of FIG. 1. The mobile cutting tool 100 comprises a tool body 110 having a first member 111 and opposite second member 112 that define an enclosure 50 for receiving a tubular structure (not shown). In the enclosure 50 there is present a non-rotatable cutting element 130, which is actuated by a (linear) actuator 120, which is connected to the tool body 110 at a first side 51 of the body 110 and enclosure 50. The actuator 120 in this embodiment is a hydraulic cylinder. An alternative actuator could be a thread bar actuator driven by an electric motor, for example. Also, a gear system may be used in order to increase the torque on the thread bar actuator. The cutting element 130 is connected to a piston rod (not shown) of this hydraulic cylinder 120. The cutting tool 100 further comprises a further actuator 150, which function is explained later. The cutting tool 100 is also provided with a buoyancy member 160, which is not essential, yet advantageous when the cutting tool 100 is used subsea. The cutting tool 100 evidently will have a significant weight and the buoyancy member 160 may be used to compensate for this weight to increase the maneuverability of the cutting tool 100. The buoyancy member 160 may also comprise a control system, which may be coupled with an ROV (not shown), which handles the cutting tool 100. On top of the cutting tool 100 there is provided a hoisting grip 170, which will be discussed in more detail later. To facilitate handling by an ROV the cutting tool 100 is provided with a handle 180. The embodiment of the figures only shows one buoyancy member 160, but there may be provided more than one distributed over the cutting tool 100 for further fine-tuning of the buoyancy of the cutting tool 100.

Figure 4:
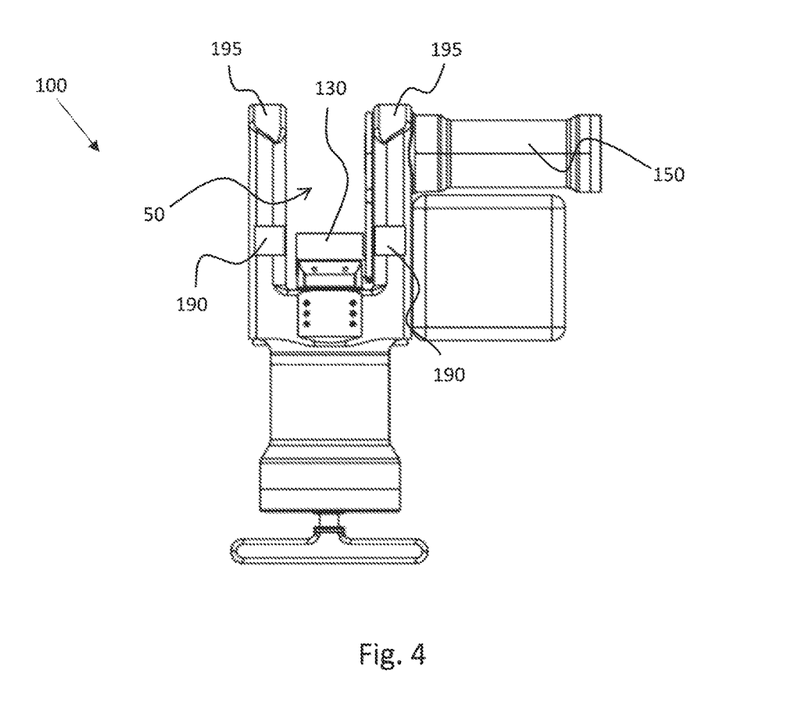
FIG. 4 shows a bottom view of the mobile cutting tool of FIG. 1.

FIG. 4 shows a bottom view of the mobile cutting tool 100 of FIG. 1. This side of the tool shows some further features.

First of all, there is provided at least one welding device 190. This welding device 190 is not essential to the cutting operation, but might be used in order to seal off the well in a better way. The cutting tool 100 of the invention may be used to cut an already-plugged well, in which case the sealing is not so important. However, the invention opens up the opportunity to combine plugging and cutting as will be explained in more detail later. In such embodiments the sealing of the tubular structure after cutting is important and in such scenario the presence of a welding device 190 is beneficial. It goes almost without saying that, as an alternative of providing a welding device 190 on the cutting tool 100, a separate welding tool (not shown) may be provided. That is why the welding device 190 is not essential to the invention, but an advantageous embodiment.

A second feature of the cutting tool 100 in FIG. 4 is the presence of a digging device 195. Also said digging device 195 is not essential, and it might be provided on a separate tool. Still, the presence of the digging device 195 is advantageous, because it facilitates quicker cutting at a location below the original level of the seabed. This will be explained in more detail later.

Figure 5:
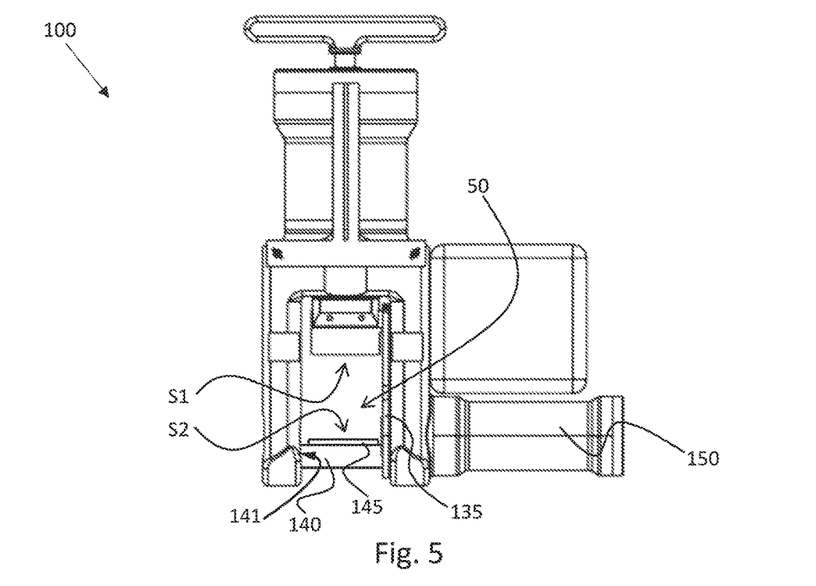
FIG. 5 shows a top view of the mobile cutting tool of FIG. 1 with the enclosure being closed.

FIG. 5 shows a top view of the mobile cutting tool 100 of FIG. 1 with the enclosure 50 being closed. This figure shows an important feature of the cutting tool 100, which is the reaction member 140. The reaction member 140 is formed by the piston rod of the earlier mentioned further actuator 150. When this further actuator 150 is activated, the reaction member 140 will show up and effectively close the enclosure 50. While the cutting element 130 is provided at a first side of the enclosure 50, the reaction member 140 provided at a second, opposite side 52 of the tool body 110 and the enclosure 50. In this embodiment the position of the piston rod (reaction member) 140 is locked when the further actuator 150 is fully extended, in that a force applied on the reaction member 140 will not result in bending of the piston rod. This may be achieved by configuring the tool body 110 with a recess 141 defined within the first member 111 such that an end of the piston rod 140 is received therein at full extension of the piston rod 140. The reaction member 140 may be provided with a further cutting element 145 to facilitate cutting of the tubular structure. In this position of the further actuator 150 the cutting tool 100 is ready for cutting the tubular structure.

Figure 6:
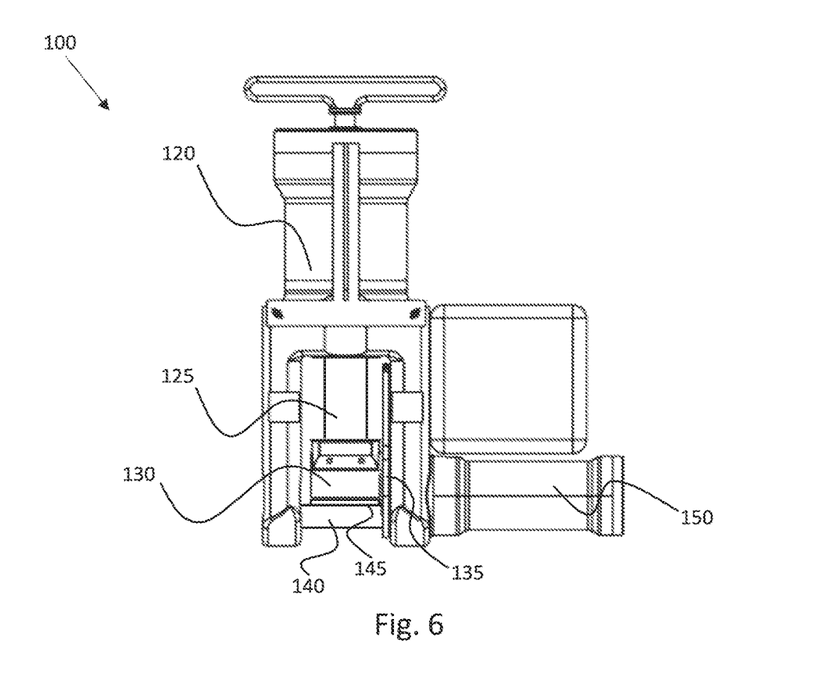
FIG. 6 shows a top view of the mobile cutting tool of FIG. 5 with the enclosure being closed and the cutting element on the actuator in its fully extended position.

FIG. 6 shows a top view of the mobile cutting tool 100 of FIG. 5 with the enclosure 50 being closed and the cutting element 130 on the actuator 120 in its fully extended position. This is the position after carrying out the cutting movement. The piston rod 125 of the actuator 120 is here visible. The figure clearly illustrates what is meant with a translational cutting movement with a non-rotatable cutting element 130, i.e. that the cutting element 130 only makes a translational movement through the enclosure without rotating during cutting. FIGS. 5 and 6 further illustrate the presence of a guide 135 at one side of the enclosure 50 for guiding the cutting element 130 when it is translated during cutting. This guide 135 is not essential, yet it prevents the cutting element 130 from rotating during cutting.

Figure 7:
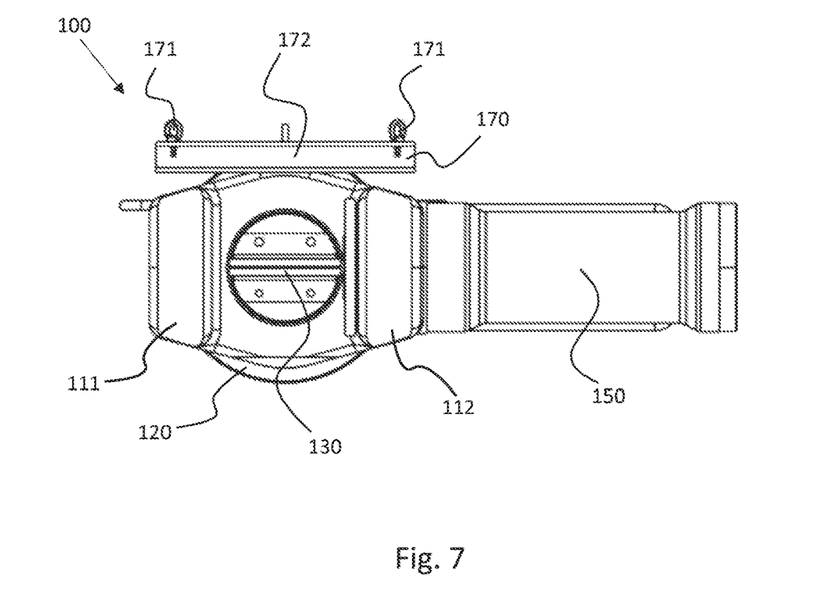
FIG. 7 shows a front view of the mobile cutting tool of FIG. 1.
Figure 8:
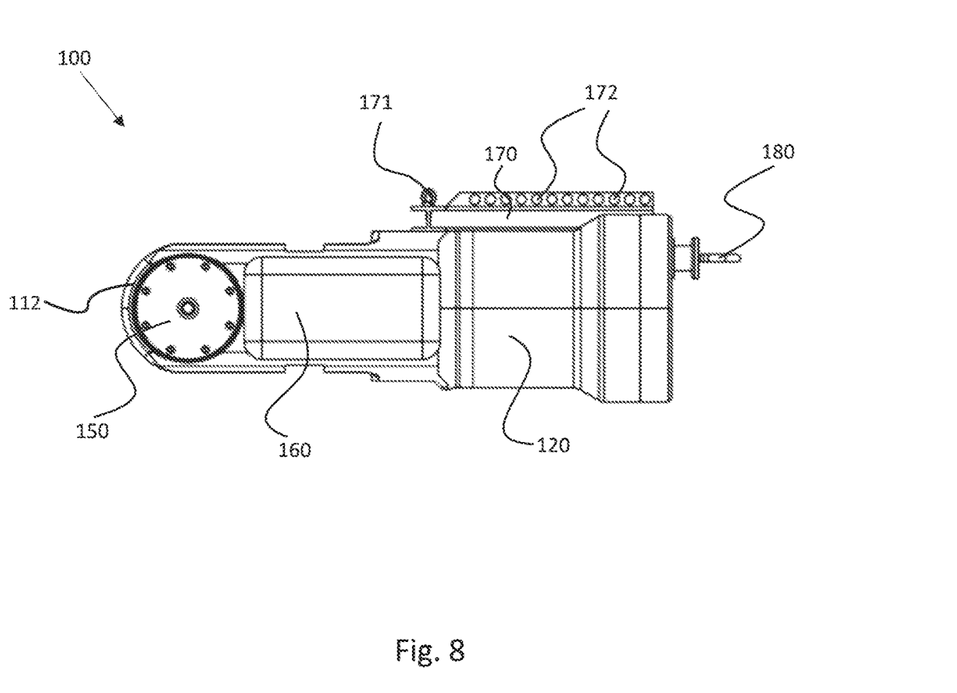
FIG. 8 shows a side view of the mobile cutting tool of FIG. 1.
Figure 9:
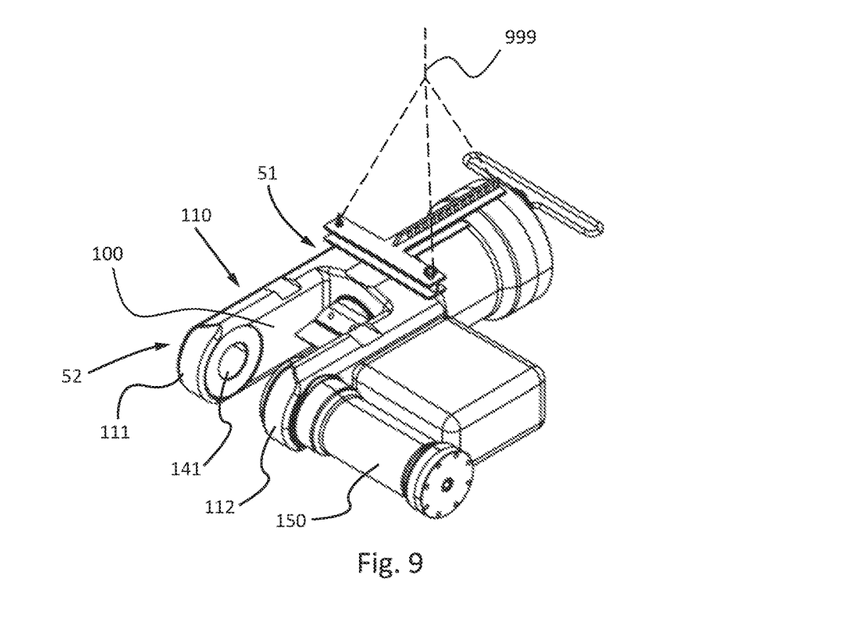
FIG. 9 shows an isometric view of the mobile cutting tool of FIG. 1, when being hoisted.

FIG. 7 shows a front view of the mobile cutting tool 100 of FIG. 1. FIG. 8 shows a side view of the mobile cutting tool 100 of FIG. 1. In these drawings the hoisting grip 170 and the handle 180 are illustrated in a bit more detail. The hoisting grip 170 comprises two fixed hoisting points 171 in the form of rings, and one adjustable hoisting connection point 172. These three hoisting points 171, 172 facilitate stable hoisting with a 3-point hoisting cable (not shown) of a crane (not shown). FIG. 9 shows an isometric view of the mobile cutting tool 100 of FIG. 1, when being hoisted with a hoisting cable 999.

Figure 10:
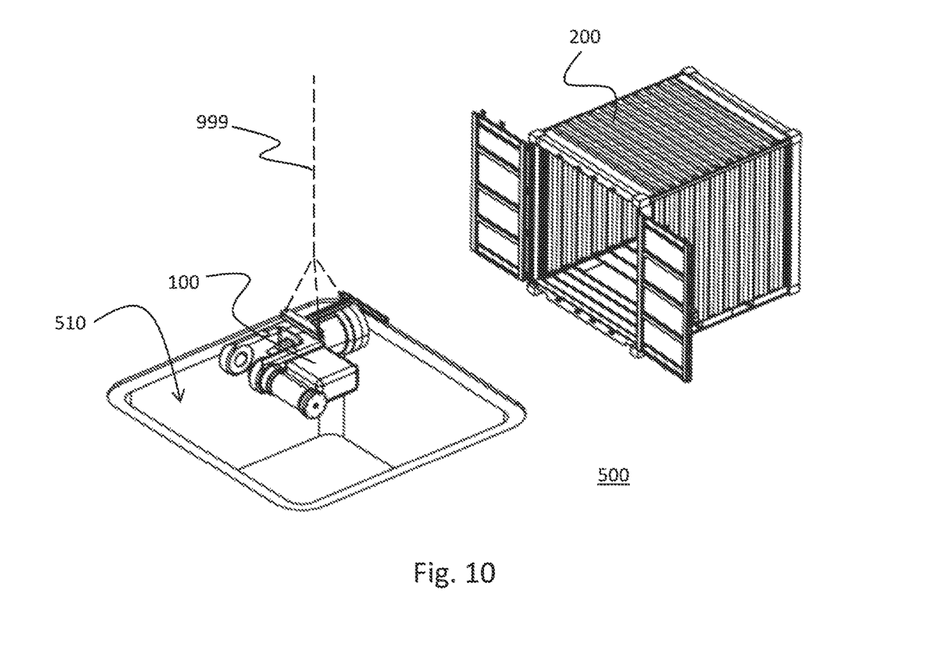
FIGS. 10-15 show different stages of a method of recovering a wellhead in accordance with an embodiment of the invention.

FIGS. 10-15 show different stages of a method of recovering a wellhead in accordance with an embodiment of the invention. FIG. 10 shows the mobile cutting tool 100 when being hoisted with a crane (not shown) from the container 200, which resides on a vessel 500 and lowered through a so-called moon pool 510 in the vessel into the sea towards the seabed.

Figure 11:
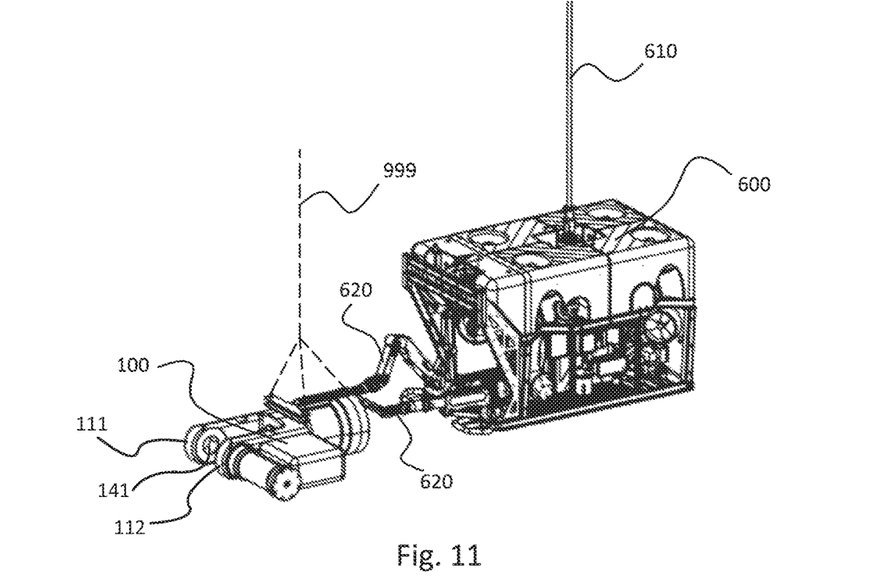

FIG. 11 shows a further stage of the method, wherein the mobile cutting tool 100 when being coupled to an ROV 600 subsea. The ROV 600 is connected with the surface through the umbilical string 610 in the conventional way. The ROV 600 connects itself to the cutting tool 100 via its robot arms 620 (manipulators), which are configured to grip the handle (not clearly shown) of the cutting tool 100. After this stage of the method, the hoisting cable 999 is loosened from the cutting tool 100. The ROV 600 will control all communication and connections, i.e. the system will operate through the ROV control and so-called dirty pack system.

Figure 12:
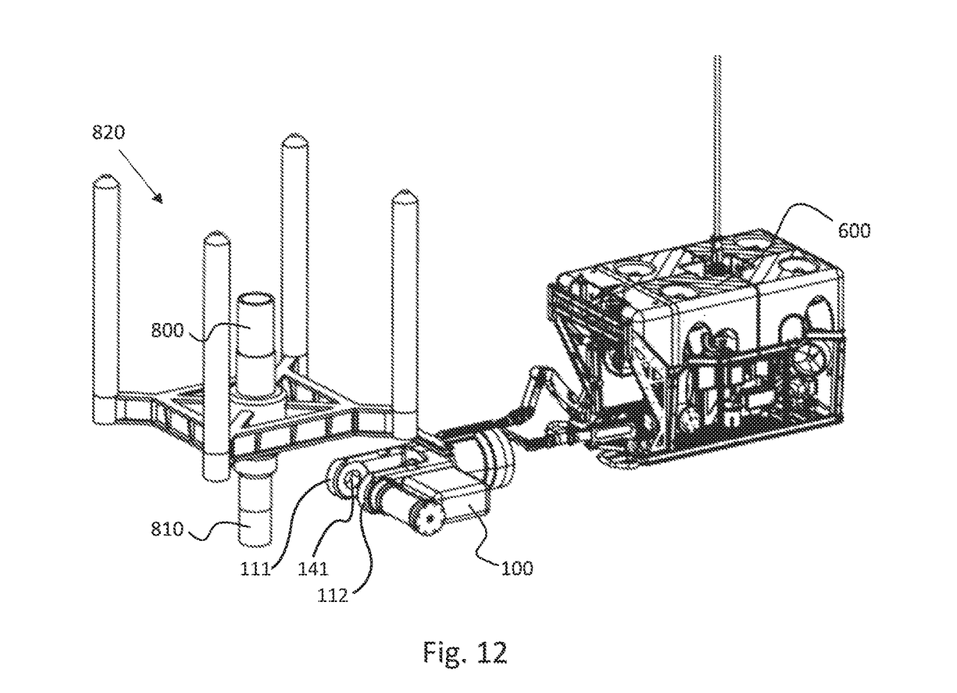

FIG. 12 shows a further stage of the method, wherein the ROV 600 moves the mobile cutting tool 100 to the wellhead 800 to be recovered. The target position is the casing 810 of the well 820 below the wellhead 800. The seabed has not been drawn in this figure.

Figure 13:
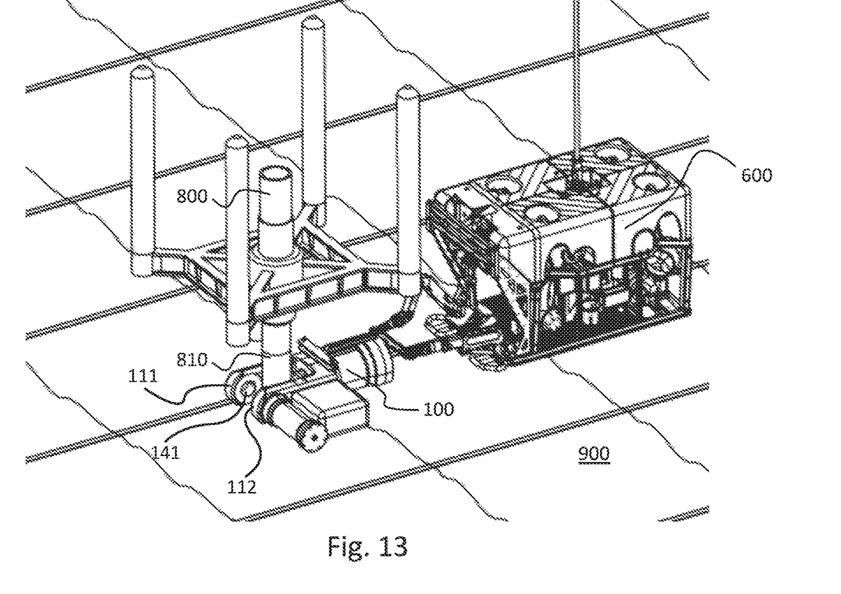

FIG. 13 shows a further stage of the method, wherein the mobile cutting tool 100 has enclosed the casing 810. In this stage of the method a pit may be jetted in the seabed 900 in order to be able to cut the casing 810 below the level of the seabed 900. This will be explained with reference to FIG. 16. As an alternative to the cutting tool 100 jetting a pit, the ROV 600 may be used to carry out this task.

Figure 14:
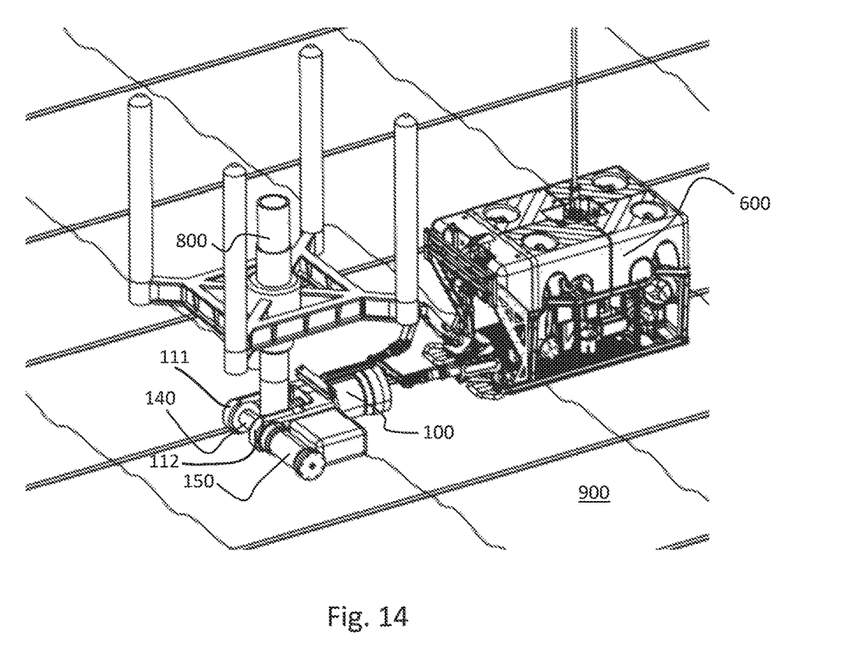

FIG. 14 shows a further stage of the method, wherein further actuator 150 has been activated to close the enclosure 50 with the reaction member 140. The mobile cutting tool 100 is now ready for cutting.

Figure 15:
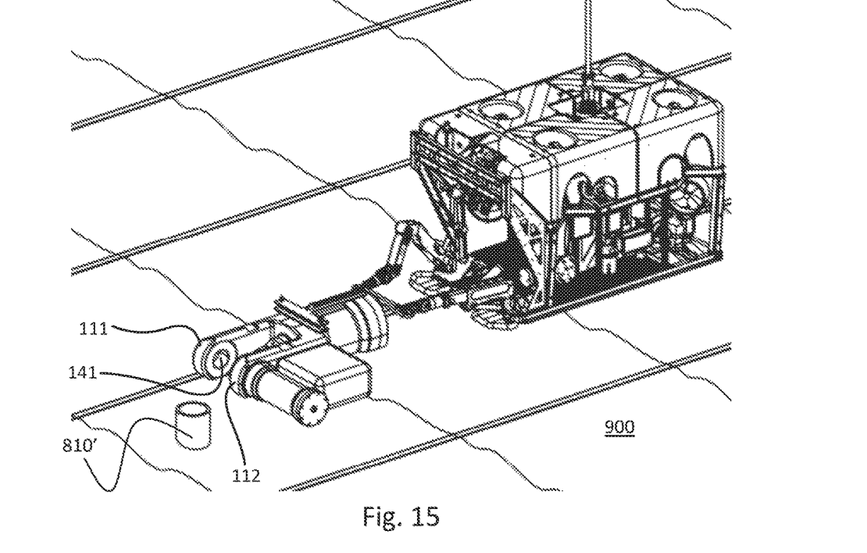

FIG. 15 shows a further stage of the method, wherein the cutting operation has been carried out. The mobile cutting tool 100 facilitates cutting the casing 810 in less than 5 minutes. The figure shows a remaining part 810' of the casing, which sticks above the seabed. In the figure the wellhead has already been hoisted back to the surface.

In the final stage (not shown in the figures) the mobile cutting tool and the ROV are retrieved and returned to the vessel, where the cutting tool 100 will be power-washed, and placed back into the container for the next run.

Figure 16:
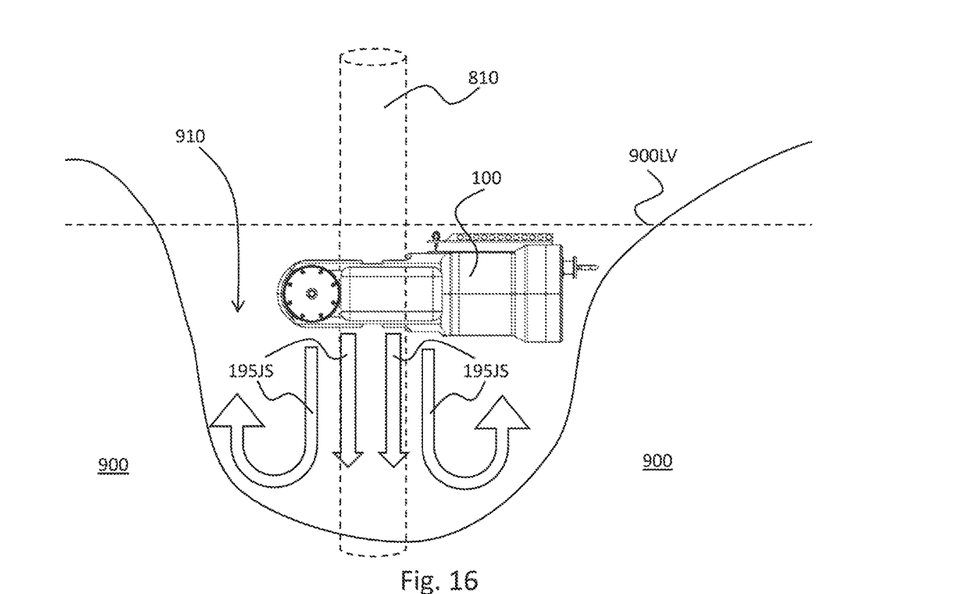
FIG. 16 shows a stage of a method of recovering a wellhead in accordance with another embodiment of the invention.

It may be desired to cut the casing such that no remaining part 810' is visible above the seabed 900. FIG. 16 shows a stage of a method of recovering a wellhead in accordance with another embodiment of the invention, wherein this problem is solved. The mobile cutting tool 100 in this embodiment is provided with a digging device (not illustrated) at a bottom side thereof. In this example this concerns a jetting device, which creates a jet stream 195JS as illustrated by the arrows. This jet stream 195JS will dig a pit or hole 910 in the seabed 900 such that a part of the casing 810 which was under the original level 900LV of the seabed is freed. It will be understood that instead of jetting a pit or hole 910, also suction or mechanical digging may be used.

Figure 17:
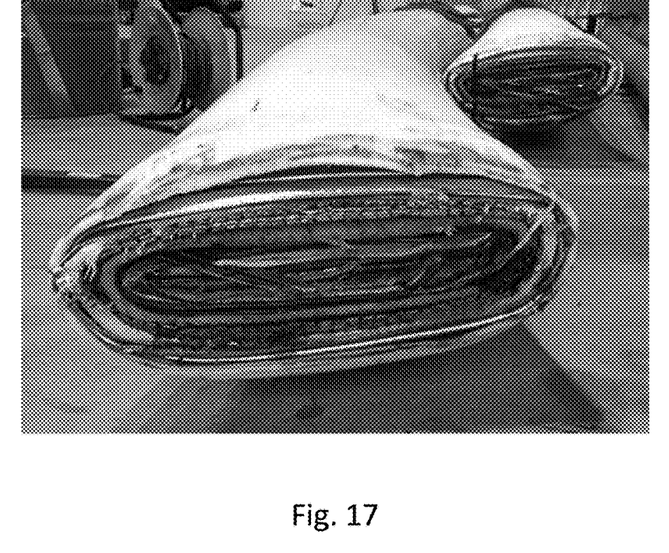
FIG. 17 shows a flexible riser, which has been cut with a mobile cutting tool and method in accordance with the invention.
Figure 18:
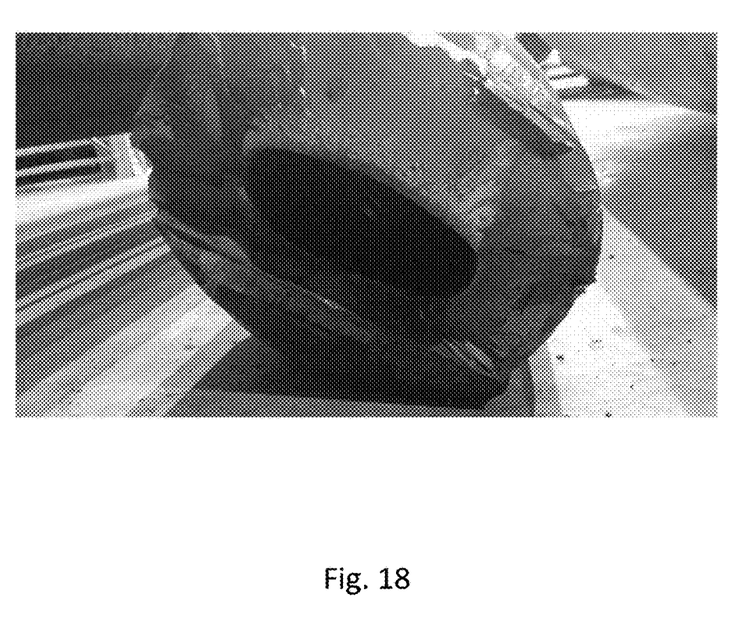
FIG. 18 shows a drill string, which has been cut with a mobile cutting tool and method in accordance with the invention.

The cutting tool and method of the invention have been tested. FIG. 17 shows a flexible riser, which has been cut with a mobile cutting tool and method in accordance with the invention. The riser has an internal diameter of 8 inch (=203.2 mm). FIG. 18 shows a drill string, which has been cut with a mobile cutting tool and method in accordance with the invention. The cut was even carried out at the location of the joint where the drill string is much thicker. The drill pipe had a diameter of 6,625 inch (=168,275 mm).

Figure 19:
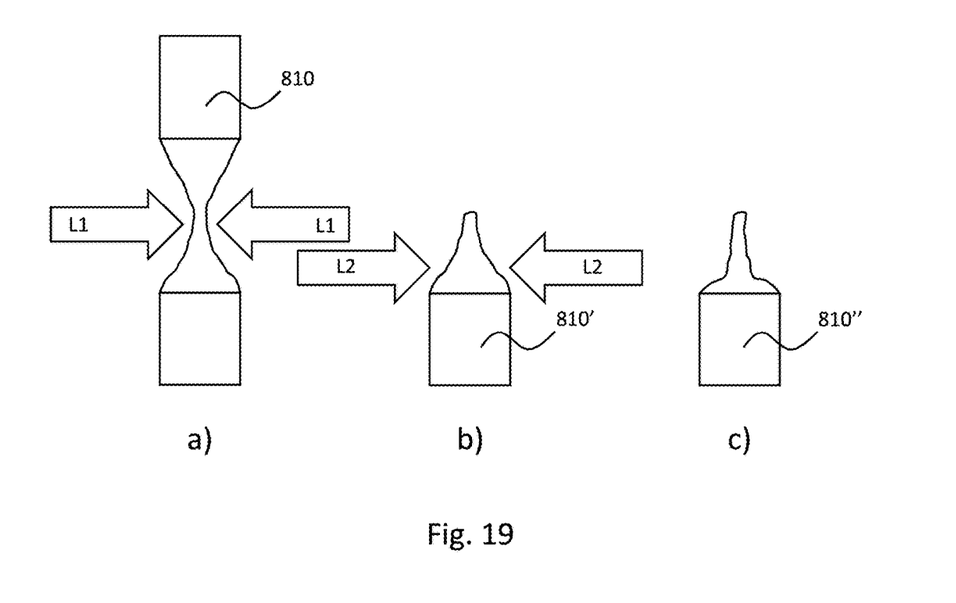
FIG. 19 illustrates the principle of cold welding in accordance with an embodiment of the invention.

FIG. 19 illustrates the principle of cold welding in accordance with an embodiment of the invention. It has already been explained that in many situations the cutting tool 100 in accordance with the invention will result in the tubular structure 810, for instance a casing of a well below the wellhead, to be squeezed together as illustrated in FIG. 19a, where the tubular structure 810 is being squeezed and finally cut at a specific location L1. The resulting structure is the remaining part 810' of the casing that is illustrated in FIG. 19b. It may very well be that this remaining part 810' is already closed, i.e. cold-welded. FIG. 19b illustrated that the cold-welding effect can be improved by squeezing the structure at a second location L2 a bit below the cutting location L1. It is important that the remaining part 810' is not completely cut in this second run. The resulting structure, a properly cold-welded remaining part 810" of the casing is shown schematically in FIG. 19c.

Figure 20:
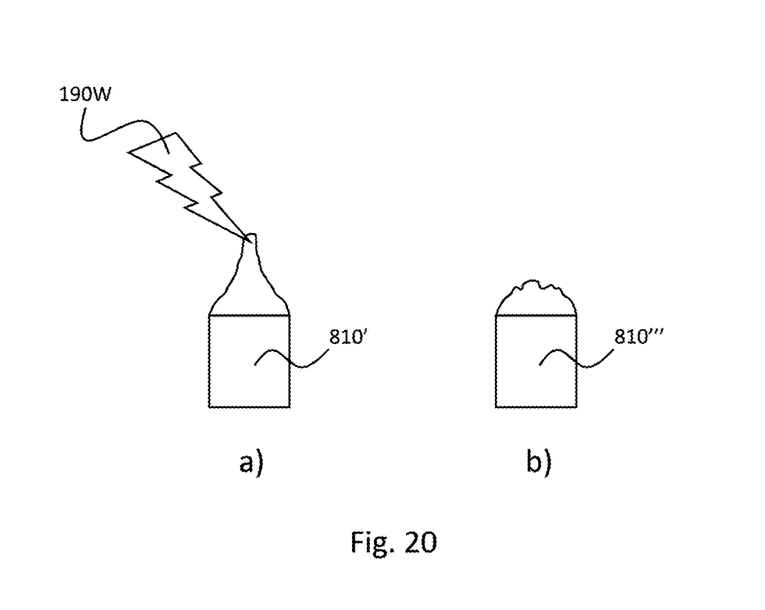
FIG. 20 illustrates the principle of hot welding in accordance with an embodiment of the invention.

FIG. 20 illustrates the principle of hot welding in accordance with an embodiment of the invention. The structure of FIG. 20a is effectively the same as the structure of FIG. 19b. The difference relies in the way this structure is processed further. Instead of carrying out a further squeezing step a (hot) welding step is carried out, which is schematically illustrated with the lightning symbol 190W. Different techniques have been proven to work subsea, such as: shielded metal arc-welding, flux cored arc-welding, and gas tungsten arc-welding. It is very likely, however, that other techniques will also work, such as magnetic-pulse sealing as disclosed in U.S. Pat. No. 5,188,177. After carrying out these steps, the structure, a hot-welded/sealed remaining part 810''' of the casing, as illustrated in FIG. 20b, remains.

The advantage of cold and hot welding of the casing as illustrated in FIGS. 19 and 20 is that this opens up the possibility of omitting plugging of the well before removal of the wellhead, which saves a lot of additional operational costs and time.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A mobile cutting tool for cutting a subsea tubular structure, the mobile cutting tool comprising:
   a tool body having an enclosure for receiving the subsea tubular structure;
   a non-rotatable cutting element configured to carry out a translational cutting movement through the enclosure so as to cut the subsea tubular structure;
   an actuator mounted on the tool body at one side of the enclosure and configured to actuate the non-rotatable cutting element;
   a reaction member located at an opposite side of the enclosure, opposite to the cutting element, and configured to apply a reaction force on the subsea tubular structure during cutting; and
   a further actuator comprising a hydraulic cylinder mounted at the opposite side of the enclosure of the tool body, the further actuator configured to actuate a piston rod or thread bar coupled to the reaction member so as to open and close the enclosure, for receiving and retaining the subsea tubular structure, respectively.

2. The mobile cutting tool according to claim 1, wherein the reaction member is provided on or integrated with the piston rod or the thread bar of the further actuator.

3. The mobile cutting tool according to claim 2, wherein the further actuator, the piston rod or the thread bar, and the reaction member are aligned with a recess in the tool body transversely opposite the further actuator.

4. The mobile cutting tool according to claim 1, further comprising at least one buoyancy member for controlling the buoyancy of the mobile cutting tool when the mobile cutting tool is used subsea.

5. The mobile cutting tool according to claim 1, further comprising at least one digging device for digging into the seabed for freeing a greater length of the tubular structure extending through the seabed.

6. The mobile cutting tool according to claim 1, further comprising at least one welding device for welding the subsea tubular structure after the subsea tubular structure has been cut.

7. The mobile cutting tool according to claim 6, wherein the welding device is selected from a group comprising: a shielded metal arc-welding device, a flux cored arc-welding device, and a gas tungsten arc-welding device.

8. The mobile cutting tool according to claim 1, wherein the mobile cutting tool is provided with a handle for being coupled to and handled by a subsea vehicle.

9. The mobile cutting tool according to claim 1, wherein the mobile cutting tool is part of a subsea system, the system further comprising: a subsea vehicle, wherein the mobile cutting tool is coupled to the subsea vehicle.

10. A method for cutting a subsea tubular structure, the method comprising the following steps:
providing a mobile cutting tool comprising:
a tool body having an enclosure for receiving the subsea tubular structure;
a non-rotatable cutting element configured to cut the subsea tubular structure;
an actuator mounted on the tool body at one side of the enclosure and configured to actuate the non-rotatable cutting element;
a reaction member located at an opposite side of the enclosure, opposite to the cutting element, and configured to apply a reaction force on the subsea tubular structure during cutting; and
a further actuator comprising a hydraulic cylinder mounted at the opposite side of the enclosure of the tool body, the further actuator configured to actuate a piston rod or thread bar coupled to the reaction member so as to open and close the enclosure, for receiving and retaining the subsea tubular structure, respectively;
positioning the mobile cutting tool in cutting position exterior to the subsea tubular structure;
fixing the position of the mobile cutting tool with respect to the subsea tubular structure, and
activating the mobile cutting tool for cutting the subsea tubular structure in a translation movement of the cutting element.

11. A method for recovering a subsea wellhead from a casing of a well, the method comprising the method according to claim 10.

12. The method according to claim 11, wherein the subsea tubular structure comprises the casing of the wellhead between the seabed and the wellhead, and wherein, in the step of positioning the mobile cutting tool, the mobile cutting tool is positioned exterior to the casing and below the wellhead, and wherein, in the step of activating the mobile cutting tool, the wellhead is separated from the well.

13. The method according to claim 12, further comprising the step of digging into the seabed for freeing a greater length of the casing for allowing cutting of the casing below an original level of the seabed.

14. The method according to claim 13, wherein, in the step of positioning the mobile cutting tool, the mobile cutting tool is positioned below the original level of the seabed.

15. The method according to claim 10, further comprising the step of welding the subsea tubular structure after the subsea tubular structure has been cut.

16. The method according to claim 10, wherein the positioning of the mobile cutting tool is done with a subsea vehicle.

17. The method according to claim 10, further comprising, before the step of positioning the mobile cutting tool in cutting position, the step of lowering the mobile cutting tool from the sea surface into the sea by means of a hoisting tool.

18. A mobile cutting tool for cutting a subsea tubular structure, the mobile cutting tool comprising:
a tool body having an enclosure for receiving the subsea tubular structure;
a non-rotatable cutting element configured to carry out a translational cutting movement through the enclosure so as to cut the subsea tubular structure;
an actuator mounted on the tool body at one side of the enclosure and configured to actuate the non-rotatable cutting element;
a reaction member located at an opposite side of the enclosure, opposite to the cutting element, and configured to apply a reaction force on the subsea tubular structure during cutting; and
a further actuator mounted at the opposite side of the enclosure of the tool body, the further actuator configured to actuate a piston rod or thread bar coupled to the reaction member to thereby open and close the enclosure for receiving and retaining the subsea tubular structure, respectively;
wherein the further actuator, the piston rod or the thread bar, and the reaction member are aligned with a recess in the tool body, transversely opposite the further actuator.

19. The mobile cutting tool according to claim 18, wherein the reaction member is provided on or integrated with the piston rod or the thread bar of the further actuator.

20. The mobile cutting tool according to claim 18, wherein the further actuator comprises a hydraulic cylinder mounted at the opposite side of the enclosure of the tool body.

* * * * *